Aug. 30, 1927.                                          1,640,521
F. T. WHEELER
BOX CONNECTER
Filed Dec. 5, 1921

INVENTOR
Frank T. Wheeler,
ATTORNEYS.

Patented Aug. 30, 1927.

1,640,521

UNITED STATES PATENT OFFICE.

FRANK T. WHEELER, OF PLAINVILLE, CONNECTICUT, ASSIGNOR TO THE TRUMBULL ELECTRIC MANUFACTURING COMPANY, OF PLAINVILLE, CONNECTICUT, A CORPORATION OF CONNECTICUT.

BOX CONNECTER.

Application filed December 5, 1921. Serial No. 519,808.

In modern electrical installations, the switches and cut-out are enclosed in metallic boxes, and the wiring is usually protected by steel conduits. Where the boxes are very near each other, it is desirable to protect the communicating conductors by some form of device which can be readily assembled or installed with the boxes.

One object of my invention is to so construct such a device that the conductors may be readily installed without passing them through tubular connecting devices.

In the preferred form of the invention, the connecter is of U-shape and provided with a hinged cover or flap which may be opened to insert the wires and which will be held in place by the covers of the boxes when the installation is complete.

6 and 7 illustrate more or less diagrammatically typical boxes or receptacles which are connected by the connecter 9.

Figure 1:
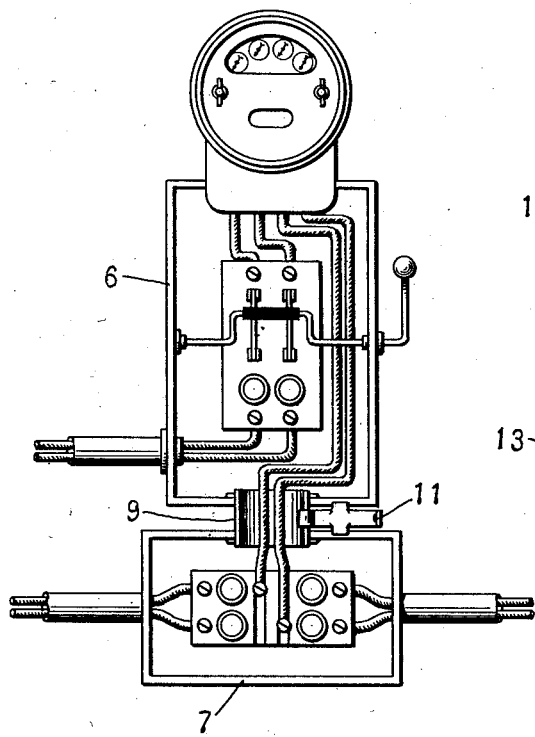
Figure 1 illustrates two boxes with a connecter embodying the improvements of my invention, the boxes and the connecting device between them being shown open.

In the form shown, the connecting device is formed of sheet metal bent into U-shape, and adapted to be inserted in correspondingly shaped openings in adjacent walls of two boxes so that the conductors may be laid in place as indicated in Fig. 1.

The outer face of the connecter is adapted to be closed by means of a cover 11 which fits between the flanges of the covers 12 and 13 of the adjacent boxes.

Figure 2:
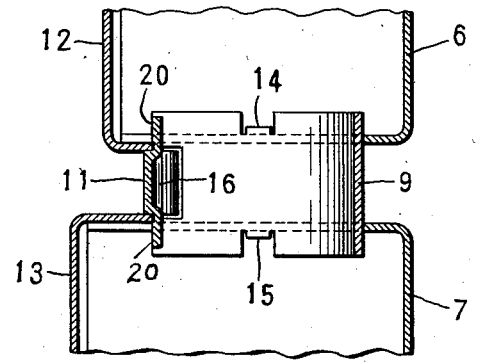
Fig. 2 is a sectional view showing the connecting construction on a lorger scale than Fig. 1, with the box covers in place.

To prevent the relative endwise movements of the connecter, I prefer to provide stops or lugs 14 and 15 which fit inside the boxes as indicated in Figs. 1 and 2.

Figure 3:
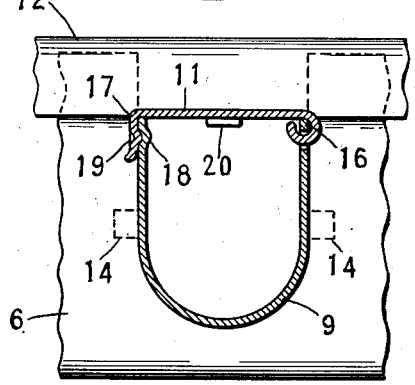
Fig. 3 is a transverse sectional view through the connecter.
Figure 4:
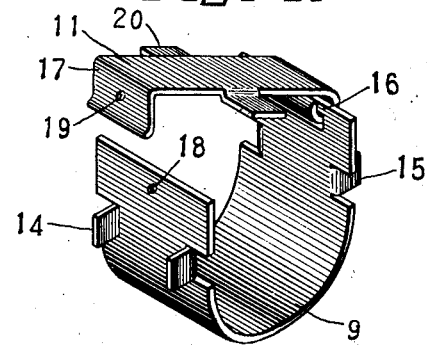
Fig. 4 is a perspective view of one of the connecting devices with the cover flap partly open.

For convenience in handling the parts and in assembling them, I prefer to pivot the cover 11 on the hinge part 16 so that the cover may be readily swung up out of the way to permit introduction of the wires, and so that it may be readily swung in the opposite direction to close the connecter. The opposite end of the cover or flap 11 is preferably bent over at 17 so as to overlap the opposite edge of the connecter. Recessed or bossed portions 18 and 19 may be provided to more securely hold the parts in position as shown in Fig. 3.

I also prefer to have the cover 11 formed so that a part of it, for instance, in the form of a lug or lugs 20, may project under the edge of a box cover so that when the box is closed it will be impossible to raise the connecter cover and obtain access to the wires therein.

It should be understood that I have shown only one form of the invention, and that I consider that changes may be made in the details of construction, without departing from the spirit or scope of my invention.

I claim:

1. An electric box connecter comprising a U-shaped sheet-metal member having positioning lugs formed by cutting the opposite ends of said member and bending portions outwardly and leaving flangeless portions projecting endwise beyond the lugs, and a relatively narrow cover hinged to one edge of said member and adapted to detachably engage the other edge and having laterally extending lugs adapted to be engaged by a cooperating switch box cover.

2. Apparatus of the character described comprising two boxes having covers and with openings in the adjacent sides of the boxes, a U-shaped sheet metal connecter having its opposite ends fitting in said openings and projecting inwardly beyond the sides of said boxes and provided with positioning lugs, a narrow cover for said connecter hinged to one edge thereof having laterally extending lugs and adapted to swing between the adjacent sides of said boxes when the box covers are open, the said box covers engaging the connecter edges and the connecter cover lugs to hold the connecter and its cover securely in place when the box covers are closed.

3. A U-shaped sheet metal connecter, a narrower cover permanently hinged at one edge thereof, spring means for interlocking the opposite edges of said cover and said connecter, positioning lugs at the opposite ends of said connecter projecting laterally therefrom, the opposite ends of said connecter projecting outwardly beyond said lugs in substantially the same plane as the remainder of the connecter.

FRANK T. WHEELER.